United States Patent
Mak

(10) Patent No.: US 10,824,823 B1
(45) Date of Patent: Nov. 3, 2020

(54) MULTIPLE RFID TRANSPONDERS ON A SINGLE INLAY

(71) Applicant: STAR Systems International Limited, Kwai Chung (HK)

(72) Inventor: Chi Lun Mak, Kwai Chung (HK)

(73) Assignee: STAR SYSTEMS INTERNATIONAL LIMITED, Kwai Chung (HK)

(*) Notice: Subject to any disclaimer, the term of this patent is extended or adjusted under 35 U.S.C. 154(b) by 0 days.

(21) Appl. No.: 16/674,344

(22) Filed: Nov. 5, 2019

(51) Int. Cl.
| | |
|---|---|
| *G06K 7/10* | (2006.01) |
| *H01Q 1/22* | (2006.01) |
| *H04B 5/00* | (2006.01) |

(52) U.S. Cl.
CPC ....... *G06K 7/10108* (2013.01); *H01Q 1/2216* (2013.01); *H04B 5/0062* (2013.01)

(58) Field of Classification Search
None
See application file for complete search history.

(56) References Cited

U.S. PATENT DOCUMENTS 9,122,969 B2 * 9/2015 Fein ............... G06K 19/072

* cited by examiner

*Primary Examiner* — Kristy A Haupt
(74) *Attorney, Agent, or Firm* — Bayramoglu Law Offices LLC

(57) ABSTRACT

A Radio Frequency Identification (RFID) inlay, the inlay comprising: a first RFID transponder with a first antenna, based on a first RFID protocol; a second RFID transponder with a second antenna, based on a second RFID protocol; and a conductive isolation structure; wherein the conductive isolation structure is arranged and configured such that the conductive isolation structure reduces a mutual coupling between the two closely spaced antennas, first antenna and the second antenna, and therefore enhancing the read range performance of both RFID transponders.

15 Claims, 14 Drawing Sheets

MULTIPLE RFID TRANSPONDERS ON A SINGLE INLAY

TECHNICAL FIELD

The present disclosure relates to a Radio Frequency Identification (RFID) transponder.

BACKGROUND

RFID is a technique used to identify objects by means of electromagnetic waves or radio frequency. An object can be tagged with an electronic code responding transponder. An electronic code responding transponder comprises an antenna and an integrated circuit, which has assigned a pre-defined communication protocol.

In practice, RFID provides a quick and affordable means to identify objects. Upon receiving a valid interrogating signal from an interrogating source, such as from an interrogating antenna of an RFID reader, the electronic code responding transponder responds according to its designed protocol. As the electronic code responding transponder has an identification code which relates to the object that the electronic code responding label is attached to, by communicating with the electronic code responding label to retrieve the identification code representing the object, one can identify the presence of the object simply by identifying the presence of the electronic code responding label. An electronic code responding transponder sometimes is known as a label, tag etc. Sometimes a transponder is also known as an inlay, it can be a dry inlay (without adhesive) or wet inlay (with adhesive). However, to facilitate discussion of the present disclosure, here we define the term "inlay" is a continuous piece of non-metallic material used as a substrate of the transponder's antenna. An inlay allows one or more transponder to sit on top.

There are mainly two types of transponders, active and passive. An active transponder would have its own battery source, has a greater read range than a passive RFID transponder. However, an active transponder is limited by the lifetime of its battery, and is more expensive, heavy and bulky than a passive tag. A passive transponder, on the other hand, is a battery-less tag energised by an interrogating signal from an interrogating source (such as an RFID reader). It has a relatively shorter read range but has the advantage of being cheaper in price, a smaller form factor, and the convenience of not needing replacement (due to the battery life) as compared with an active tag. It is vital that the antenna of a passive transponder is designed well so that the interrogating signal can be received optimally to energise the chip of the passive tag. When the chip of the passive transponder is powered up by receiving enough energy, together with a communication signal using a designed protocol, from a RFID reader though the transponder antenna, the same antenna is used by the chip to transmit a signal back to the RFID reader. With this back and forth wireless communication using a designed protocol, an RFID communication link is set up successfully between the RFID reader and the passive transponder. A common and simple form of a passive RFID transponder is a single one-piece antenna structure on an inlay i.e. one transponder on a single piece plastic material.

The present disclosure presents an alternative antenna system design for an RFID transponder.

Issues arise when more than one transponder is to be applied on a single entity. For example, it was discovered that in the electronic toll industry, each vehicle is attached with an RFID transponder with a unique ID to represent a unique vehicle. More often than not, the RFID transponder is passive, but can be active too.

To detect the use of a tollway, or toll-road, by a vehicle, RFID readers and reader antennas are installed along the tollway. When a vehicle with an RFID transponder passes a designated zone that is a read zone for the reader antennas, the unique ID representing the vehicle is read and the owner of the vehicle or a designated person is charged appropriately. The RFID readers and the RFID transponder must communicate through a common communication protocol.

In other words, if a reader and a transponder are using different communication protocols, the unique ID of the transponder will not be read properly by the reader even though the transponder is within a strong read zone from the reader antenna.

In fact, there are many different communication protocols, across many different operating ranges. Common operating ranges include LF band, HF band, UHF band, and microwave band. For this disclosure, the focus is for RFID tags operating within the UHF band. The global UHF RFID frequency band covers 860-960 MHz. For Europe, the ETSI band covers 865-868 MHz. In the US, the FCC band covers 902-928 MHz. Within the UHF band, common communication protocols include ISO 18000-6C (or ISO 18000-63), Title21, ATA, ISO18000-6B-80 k, TDM, etc.

Accordingly, it was discovered that if a vehicle is to travel on different tollways, each using different RFID communication protocols, the vehicle needs to have different RFID transponders.

For example, in the United States, different states have a different electronic toll system, each may be using a different communication protocol. A vehicle with a single transponder from its own state travelling within the state has no issue when using the tollway because both the transponder and the readers installed on the tollway are communicating using the pre-defined communication protocol. However, when the vehicle is travelling on interstate highways across the country, it will encounter a problem of inoperability of the single transponder, because the transponder can only support one single communication protocol from its own state.

One simple way to solve this problem is to attach multiple independent transponders on a vehicle. However, not only is it troublesome to attach many transponders, it is known that placing a transponder close to another would affect the performance of both. Normally, transponders are mounted on a vehicle windshield or headlamp, and there is limited space.

In light of the above, this disclosure offers a multiple-transponder single inlay arrangement.

SUMMARY

According to a first aspect of the present invention, there is provided an RFID inlay, the inlay comprising: a first RFID transponder with a first antenna, based on a first RFID protocol; a second RFID transponder with a second antenna, based on a second RFID protocol; and a conductive isolation structure; wherein the conductive isolation structure is arranged and configured such that the conductive isolation structure reduces a mutual coupling between the first antenna and the second antenna.

In one form, the conductive isolation structure allows the first RFID transponder and the second RFID transponder to operate close to each other on the inlay. In one form, the second RFID protocol is different from or the same as the first RFID protocol. In one form, the first RFID transponder and the second RFID transponder operate in a same frequency band. In one form, the first RFID transponder and the second RFID transponder operate in different frequency bands. In one form, the conductive isolation structure couples to the first RFID transponder and the second RFID transponder. In one form, the conductive isolation structure is positioned between the first RFID transponder and the second RFID transponder. In one form, the conductive isolation structure physically connects a part of the first antenna to a part of the second antenna. In one form, the mutual coupling is reduced to lower than −15 dB. In one form, the conductive isolation structure is further arranged and configured such that the conductive isolation structure is adjustable to fine-tune a local minimum point for the mutual coupling between the first antenna and the second antenna across their operating band. In one form, the local minimum point is at or near a mid-point of their operating frequency band.

In one form, the RFID inlay comprises a third RFID transponder with a third antenna, based on a third RFID protocol, wherein the conductive isolation structure is further arranged and configured such that the conductive structure reduces a mutual coupling between any two of the first antenna, the second antenna and the third antenna (including S12, S13, and S23). In one form, the third RFID protocol is different from or the same as the first RFID protocol and the second RFID protocol.

According to a first aspect of the present invention, there is provided an RFID inlay, the inlay comprising: a plurality of RFID transponders, each with a respective antenna, and at least two of the RFID transponders are based on different RFID protocols; and one or more conductive isolation structures; wherein the one or more conductive isolation structures are arranged and configured such that the one or more conductive structures reduces a mutual coupling between any two of the plurality of RFID transponders. In one form, the one or more conductive isolation structures allows the plurality of RFID transponders to operate close to each other on the inlay.

BRIEF DESCRIPTION OF DRAWINGS

Embodiments of the present invention will be discussed with reference to the accompanying drawings wherein.

DESCRIPTION OF EMBODIMENTS

Figure 1:
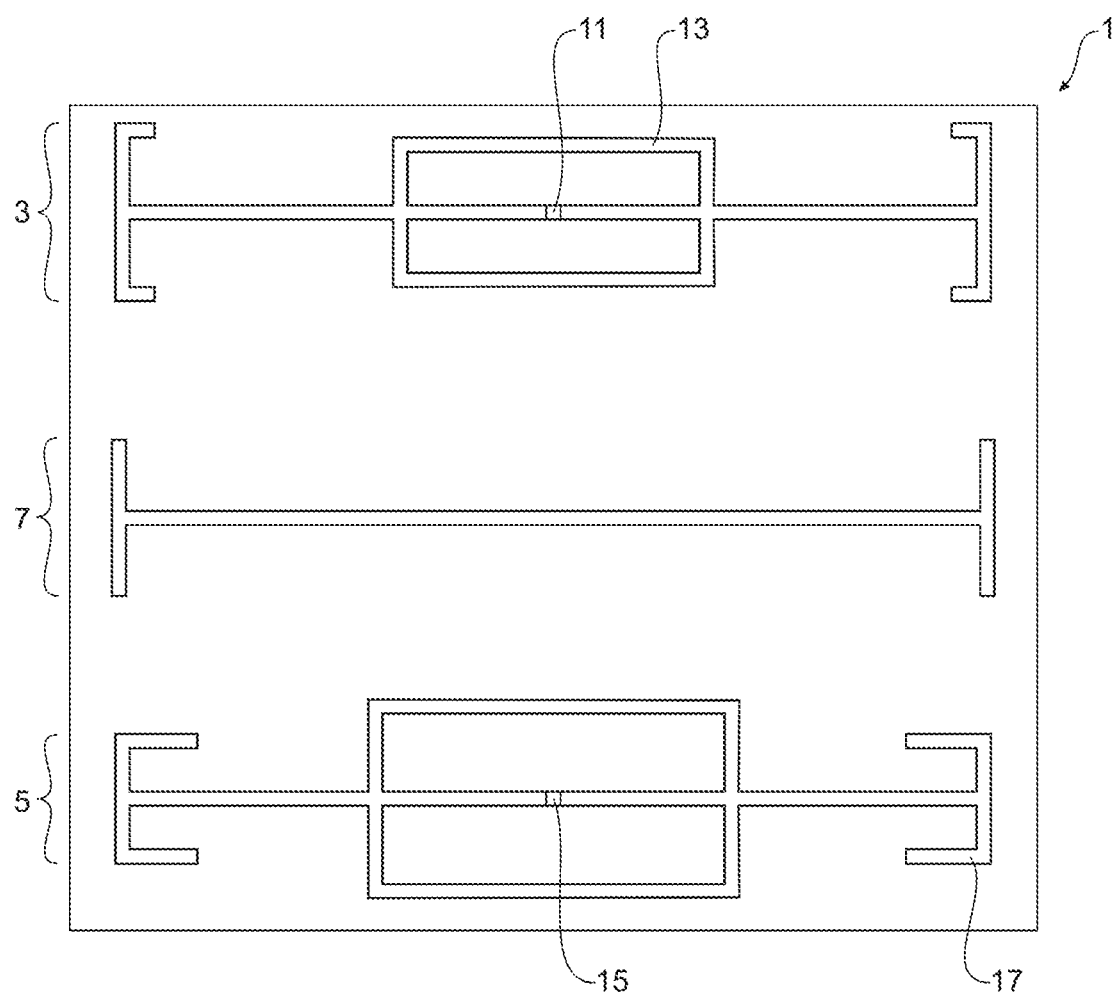
FIG. 1 depicts one embodiment of the present disclosure.

The present disclosure introduces a novel and inventive multiple-transponder single inlay arrangement.

It is desirable to have a small sized inlay with multiple transponders, so the idea is to design at least two transponders on a single inlay, where the antenna of each transponder is connected to its own chip (i.e. one transponder has one single chip for one protocol, the other transponder has another single chip for another protocol). The at least two transponder antennas may or may not operate at the same frequency band. However, it is found that by having them operating in the same frequency band, the mutual coupling effect can be much worse, and performance can be degraded significantly. Therefore, the challenge is to minimize the mutual coupling between transponder antennas while keeping a small distance between them.

The key challenge is that placing two transponder antennas close to each other would create strong and unwanted mutual coupling between the two antennas, especially when they are operating at the same frequency band and having the same polarizations. A high level of unwanted mutual coupling will significantly degrade antenna performance and, will limit the read range of both transponders.

Considering a two-port network, mutual coupling between two ports (or two antennas) is described by the S-parameter of S21 (or S12). In passive system, S21=S12, that means the two-port network is a reciprocal network. An RFID antenna is a reciprocal and passive component, i.e. without any voltage or current source. Antenna being a reciprocal component means its radiation pattern for transmitting and receiving are identical. Note that the term "passive" for antenna here is different from the term "passive" when describing a transponder. An "active", as opposed to "passive", transponder simply means whether there is a battery for the transponder. An active transponder usually still uses an antenna which is a passive and reciprocal element.

The present disclosure is about an antenna system with a technique to suppress the unwanted mutual coupling between closely packed RFID transponder antennas. Each antenna will tend to operate as if without any antennas nearby. All antennas can operate (transmit and receive) efficiently in the same frequency band (i.e. return loss of each antenna will remain low at the same frequency band). In particular, the present disclosure is to suppress the mutual coupling as low as possible (or to maintain a high isolation) when the distance between the two antennas is small.

In a broad form, a multiple-transponder single inlay arrangement comprises two RFID transponders. Of course, the same idea can be applied to an arrangement of more than two transponders. Each of the transponders is with its own antenna connected to a chip. In other words, each of the transponders is capable of using different protocols from one another. On the same inlay, there is provided one or more conductive isolation structure. This conductive isolation structure is arranged and configured such that the conductive isolation structure reduces a mutual coupling between any two RFID transponder antennas among them.

Note that the term "isolation" does not mean that that structure must be physically isolated from the RFID antennas. It simply describes the function of the isolation structure, which is to isolate the two RFID transponders so that the overall mutual coupling can be minimized. In fact, in some embodiments, the isolation structure can physically connect the RFID antennas.

The term "conductive" means the structure is made of material that can conduct electric current. It may be made of the same material used to make the antennas.

The term "inlay" means a piece of material where one or more transponder is positioned. Usually, an inlay is made of plastic. However, it can be made of any non-conductive material such as paper. An inlay may be rigid or flexible depending on the application of the inlay on a surface. For example, if an inlay with one or more RFID transponders attached thereon is to be applied on a curved surface, such as on the head lamp of a car, then the inlay would be flexible.

FIG. 1 depicts one embodiment of the present disclosure. Inlay 1 comprises a first transponder 3 and a second transponder 5. A conductive isolation structure 7 is positioned such that the first transponder 3 and the second transponder 5 would couple to the conductive isolation structure 7 and the coupling between the first transponder 3 and the second transponder 5 is reduced. In this example, the first transponder 3 comprises a chip 11 connected to an antenna 13 (all the conductive tracks of the first transponder 3 form the antenna 13 of first transponder 3). The second transponder 5 comprises a chip 15 connected to an antenna 17 (all the conductive tracks of second transponder 5 form the antenna 17 of second transponder 5). The two antennas 13, 17 of the two transponders 3, 5 are legitimate designs but are chosen arbitrarily for this embodiment, and they can take many other forms, as long as they can function as an RFID transponder's antenna. The conductive isolation structure 7 can be adjusted depending on the shape, size, relative locations, and designs of the two transponder antennas 13, 17.

The inlay 1 of FIG. 1 is measured to be 79×67 mm. The distance between the centre point of the first transponder 3 and the centre point of the second transponder 5 is 48 mm. The closest distance between the antennas 13, 17 (perpendicular distance between the edge of the loops of the antennas) of the two transponders 3, 5 is 34 mm. Of course these measurements are for illustrative purpose only and can be changed to suit the application of the RFID transponders. The key point is that the two transponders can be placed close to each other without affecting much of the functionality of each other.

Figure 2:
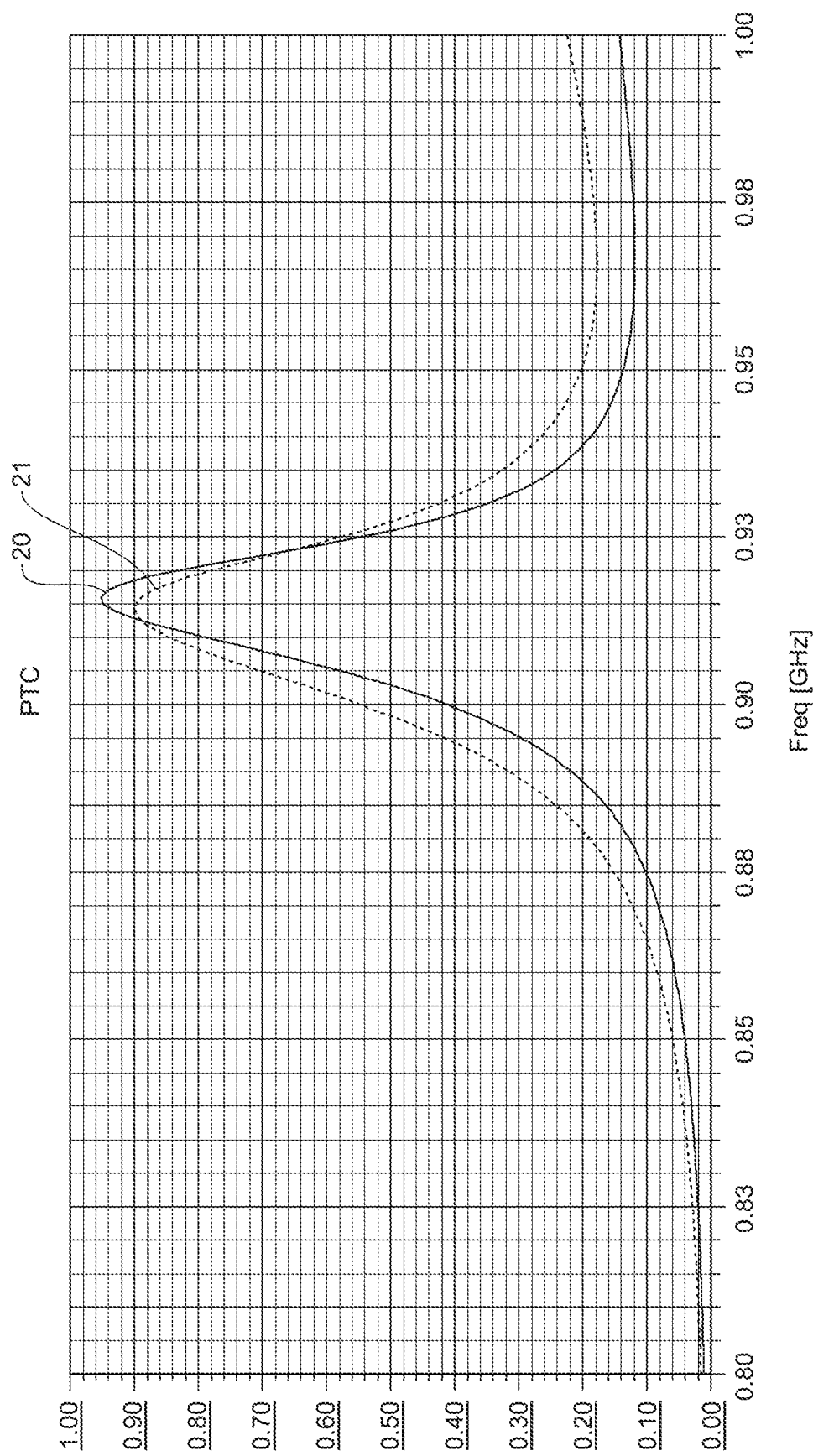
FIG. 2 depicts simulation results of the Power Transfer Coefficient (PTC) of both RFID transponders of FIG. 1.
Figure 3:
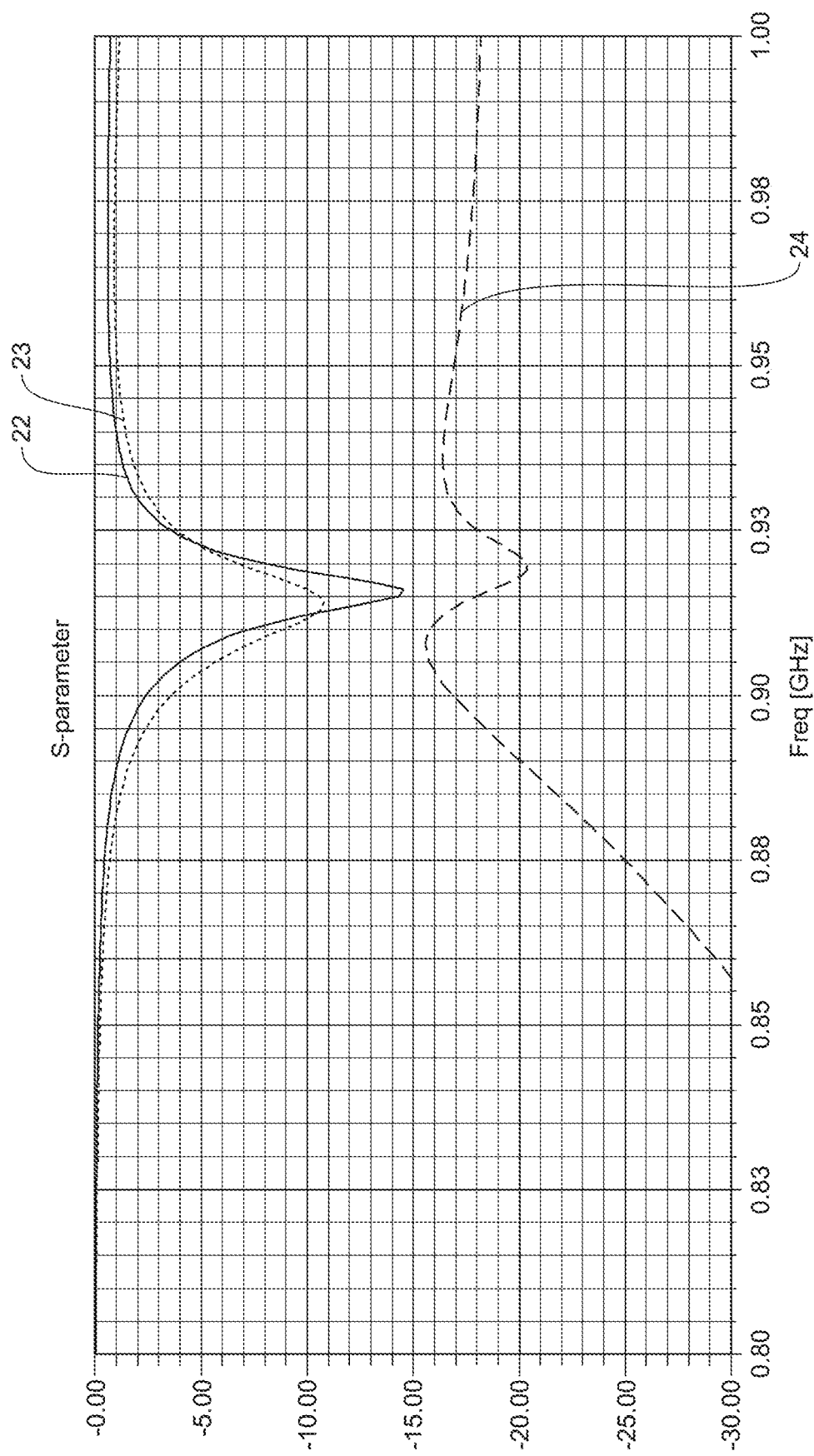
FIG. 3 depicts S-parameters of the RFID transponders of FIG. 1.

FIG. 2 depicts simulation results of the Power Transfer Coefficient (PTC) of both of the first transponder 3 and the second transponder 5. It can be seen from traces 20, 21 that the PTC peaks at 90-95% within the UHF band with the mutual coupling between the antennas 13, 17 of the first transponder 3 and the second transponder 5 reduced to lower than −15 dB. FIG. 3 shows that S11 and S22 (Return Loss of the first transponder 3 and the second transponder 5), represented by traces 22, 23, are improved and mutual coupling between the first transponder 3 and the second transponder 5, S21 or S12, is suppressed significantly (traces 24 shows that it is below −15 dB). In the absence of the conductive isolation structure 7, the PCT of both antennas 13, 17, shown by traces 25, 26, peaks at around 65-70% (shown in FIG. 4). This is caused by high mutual coupling between the first transponder 3 and the second transponder 5, causing inefficient radiation, as some power has been coupled to another antenna but not radiated. Traces 27, 28 of FIG. 5 show that, in the absence of the conductive isolation structure 7, S11 and S22, return loss of the first transponder 3 and the second transponder 5, are significantly worse, with trace 29 showing the S21 or S12 is at a much higher level (showing mutual coupling is up to −6 dB, which is undesirable) than that in the case with the conductive isolation structure 7 presents (see FIG. 3).

Figure 6:
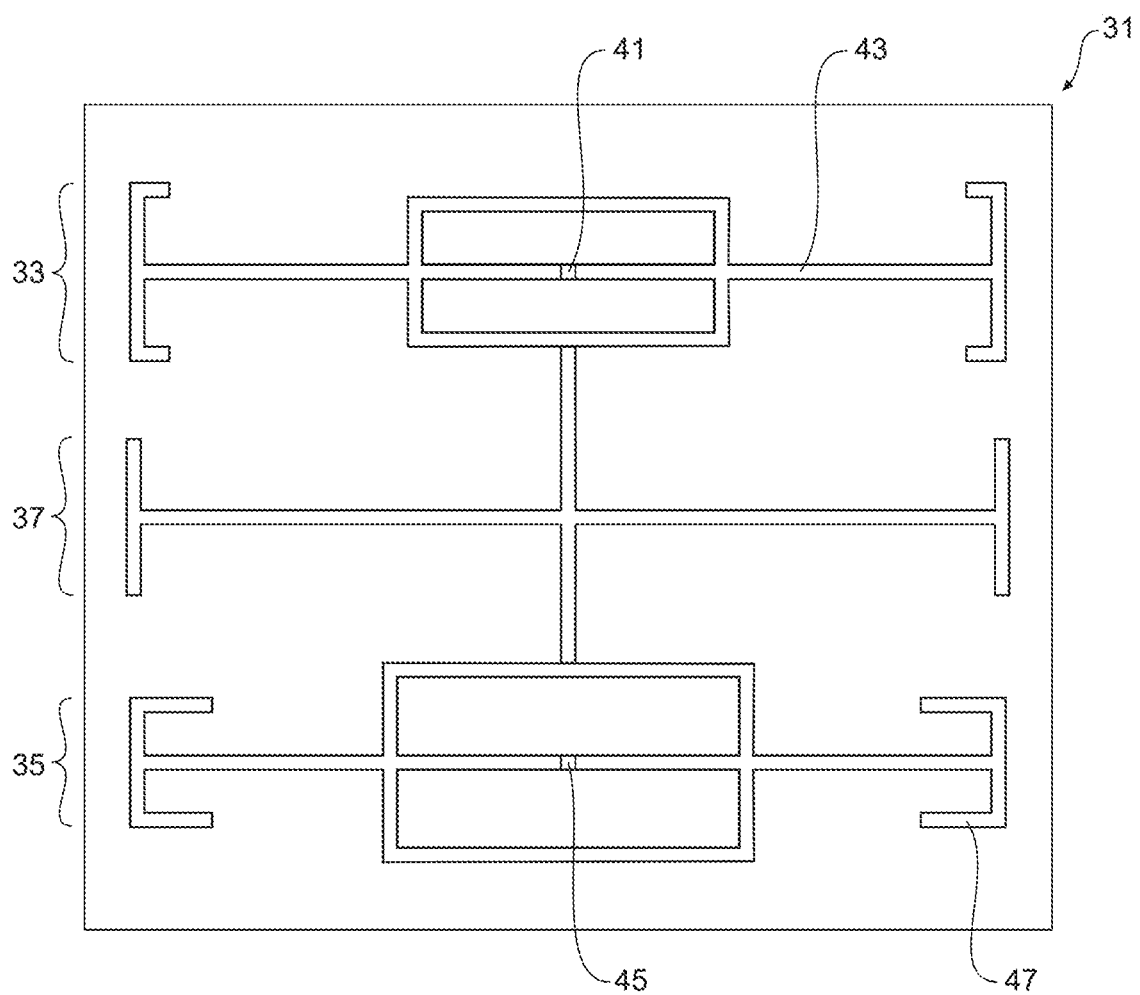
FIG. 6 depicts another embodiment of the present disclosure.
Figure 7:
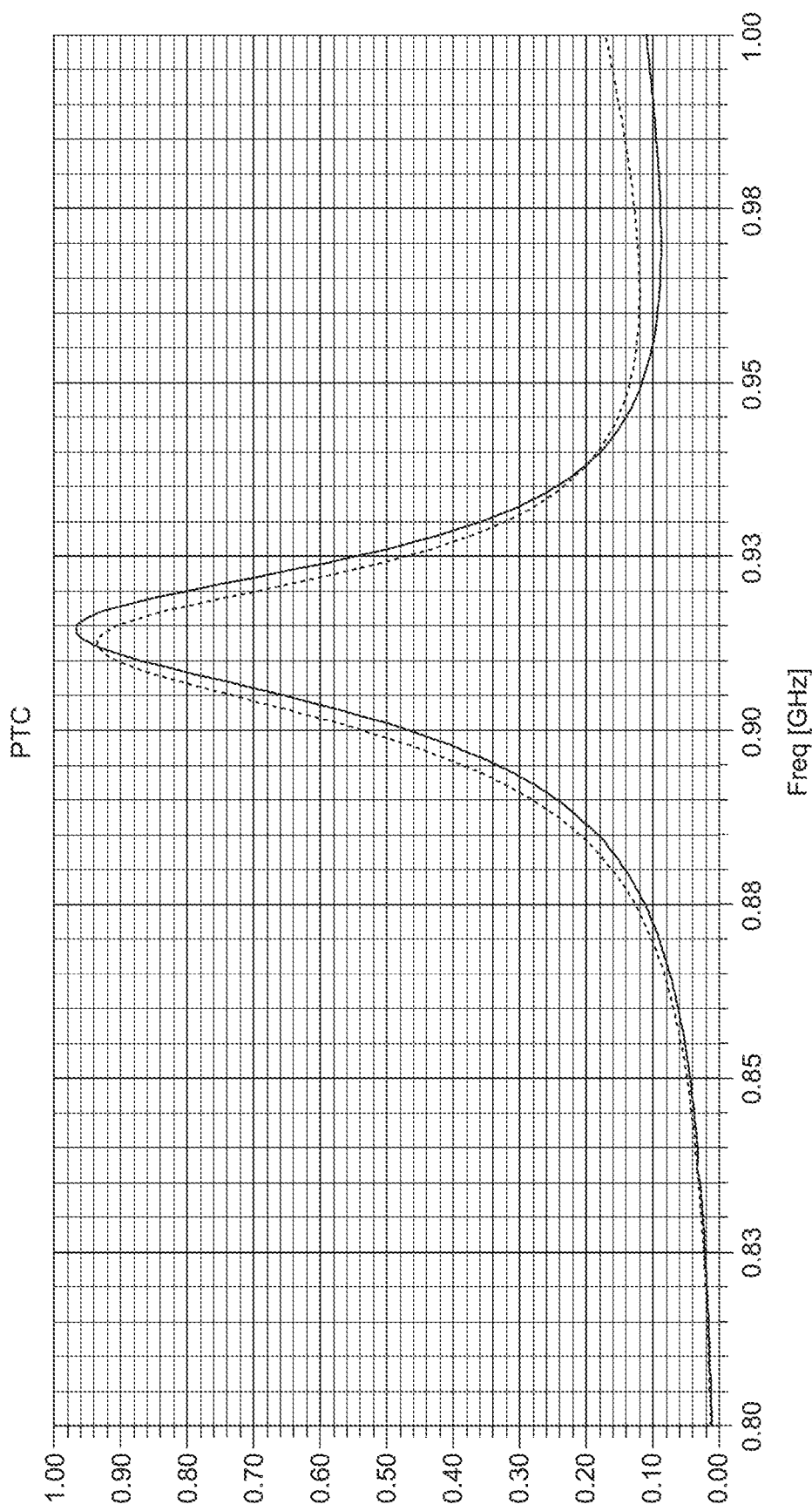
FIG. 7 depicts simulation results of the PTC of both RFID transponders of FIG. 6.
Figure 8:
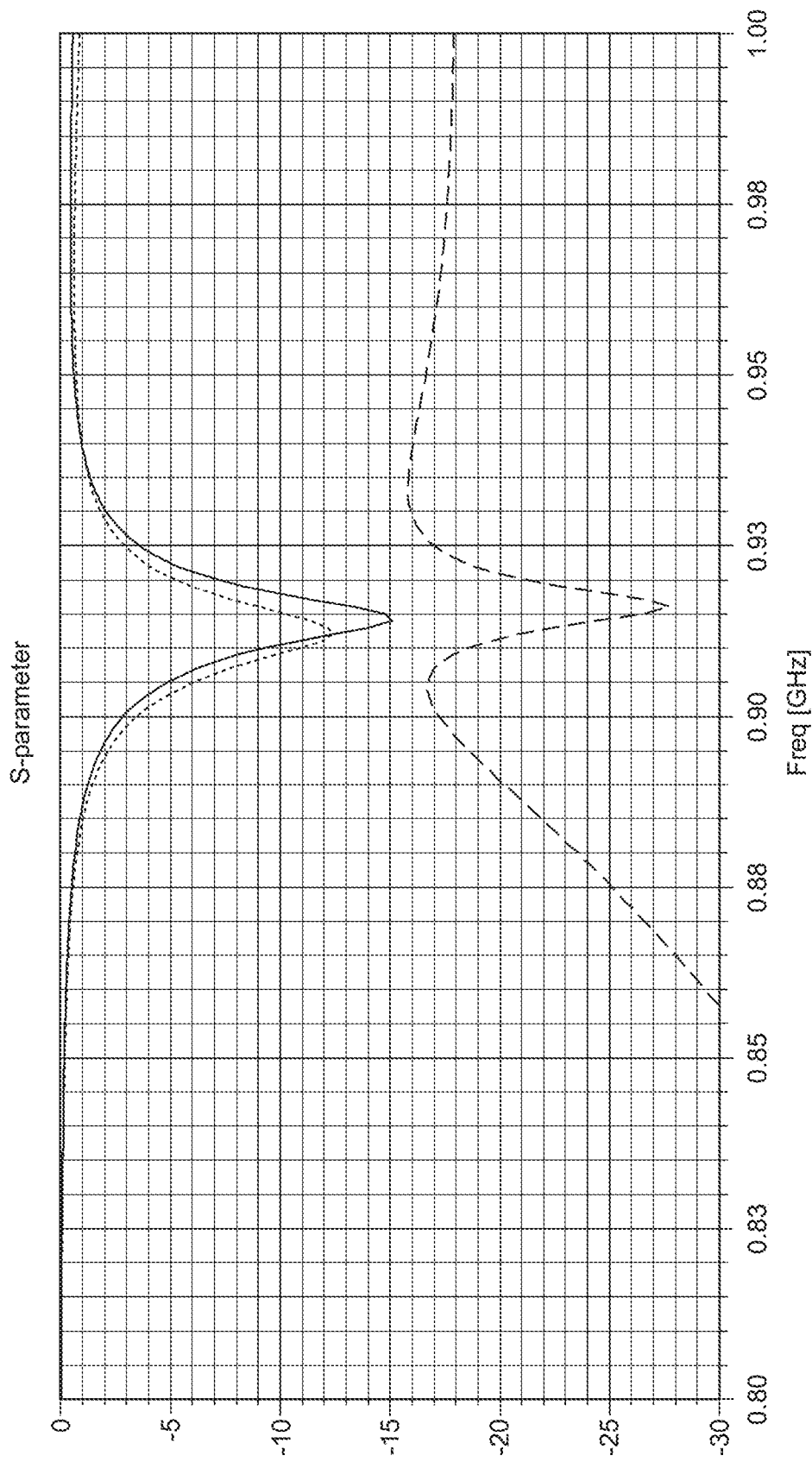
FIG. 8 depicts S-parameters of the RFID transponders of FIG. 6.

FIG. 6 depicts another embodiment of the present disclosure. In this embodiment, inlay 31 comprises a first transponder 33 and a second transponder 35. A conductive isolation structure 37 is positioned such that the first transponder 33 and the second transponder 35 would couple and connect to the conductive isolation structure 37 and the overall resultant coupling between the first transponder 33 and the second transponder 35 is reduced. In this example, the first transponder 33 comprises a chip 41 connected to an antenna 43 (all the conductive tracks of first transponder 33 form the antenna 43 of first transponder 33). The second transponder 35 comprises a chip 45 connected to an antenna 47 (all the conductive tracks of second transponder 35 form the antenna 47 of second transponder 35). Similar to the embodiment shown in FIG. 1, the two antennas 43, 47 of this embodiment can take many other forms, as long as they can function as an RFID transponder's antenna. The conductive isolation structure 37 can be adjusted depending on the shape, size, relative locations, and designs of the two transponder antennas 43, 47. The main difference between this embodiment of FIG. 6 and the embodiment of FIG. 1 is that the conductive isolation structure 37 physically touches the antennas 43, 47 of the first transponder 33 and the second transponder 35. The simulation results of this embodiment are shown in FIG. 7. It can be seen that the PTC peaks at 94-96% within the UHF band with the mutual coupling between the antennas 43, 47 of the first transponder 33 and the second transponder 35 reduced to lower than −15 dB and a sharp dip can be seen in FIG. 8. In particular, FIG. 8 shows that S11 and S22 (Return loss of the first transponder 33 and the second transponder 35) are improved and mutual coupling between the first transponder 33 and the second transponder 35, S21 or S12, is suppressed significantly.

Figure 4:
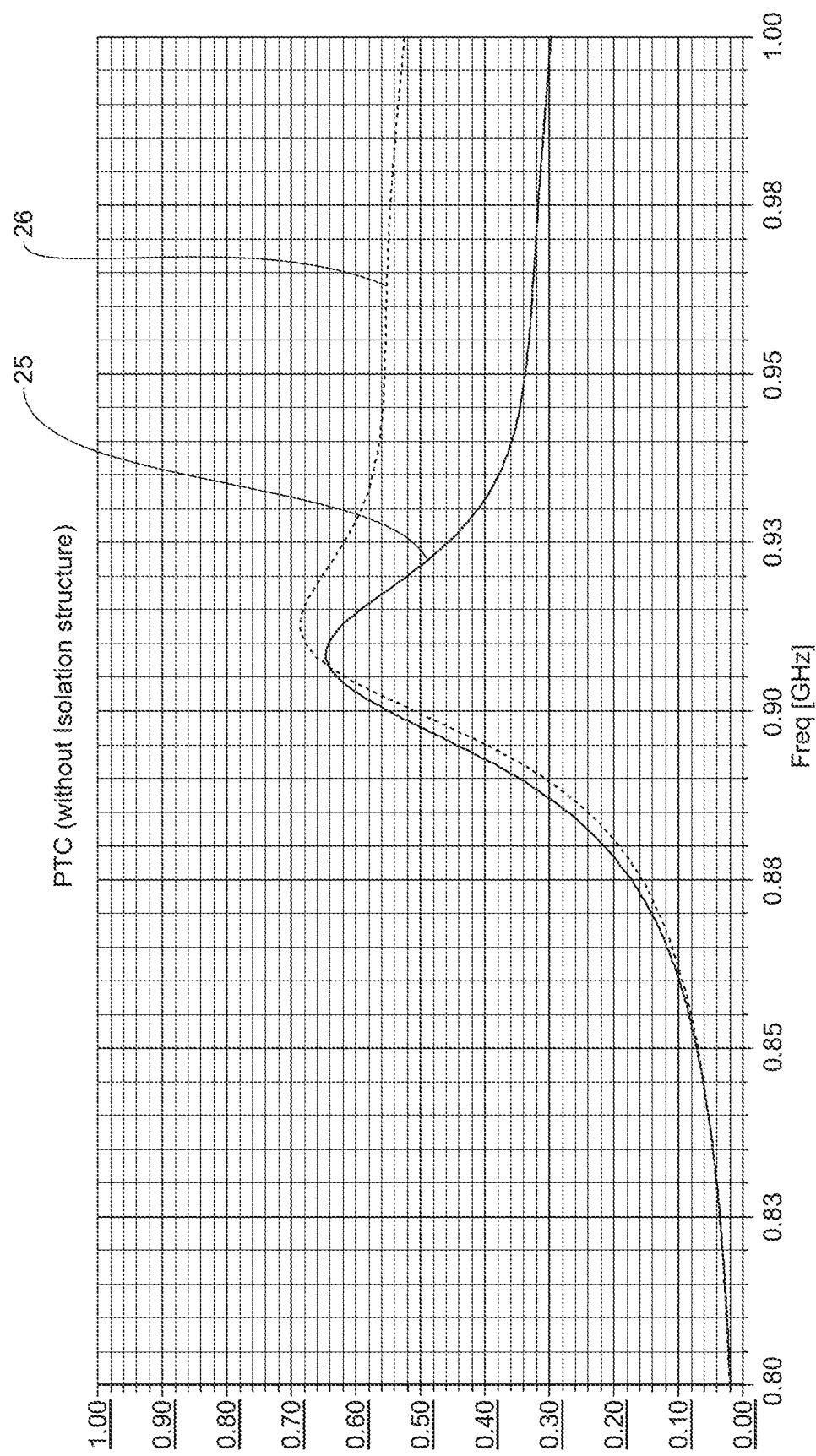
FIGS. 4 and 5 depict PTC and S-parameters of the RFID transponders of FIG. 1 in the absence of the conductive isolation structure.
Figure 5:
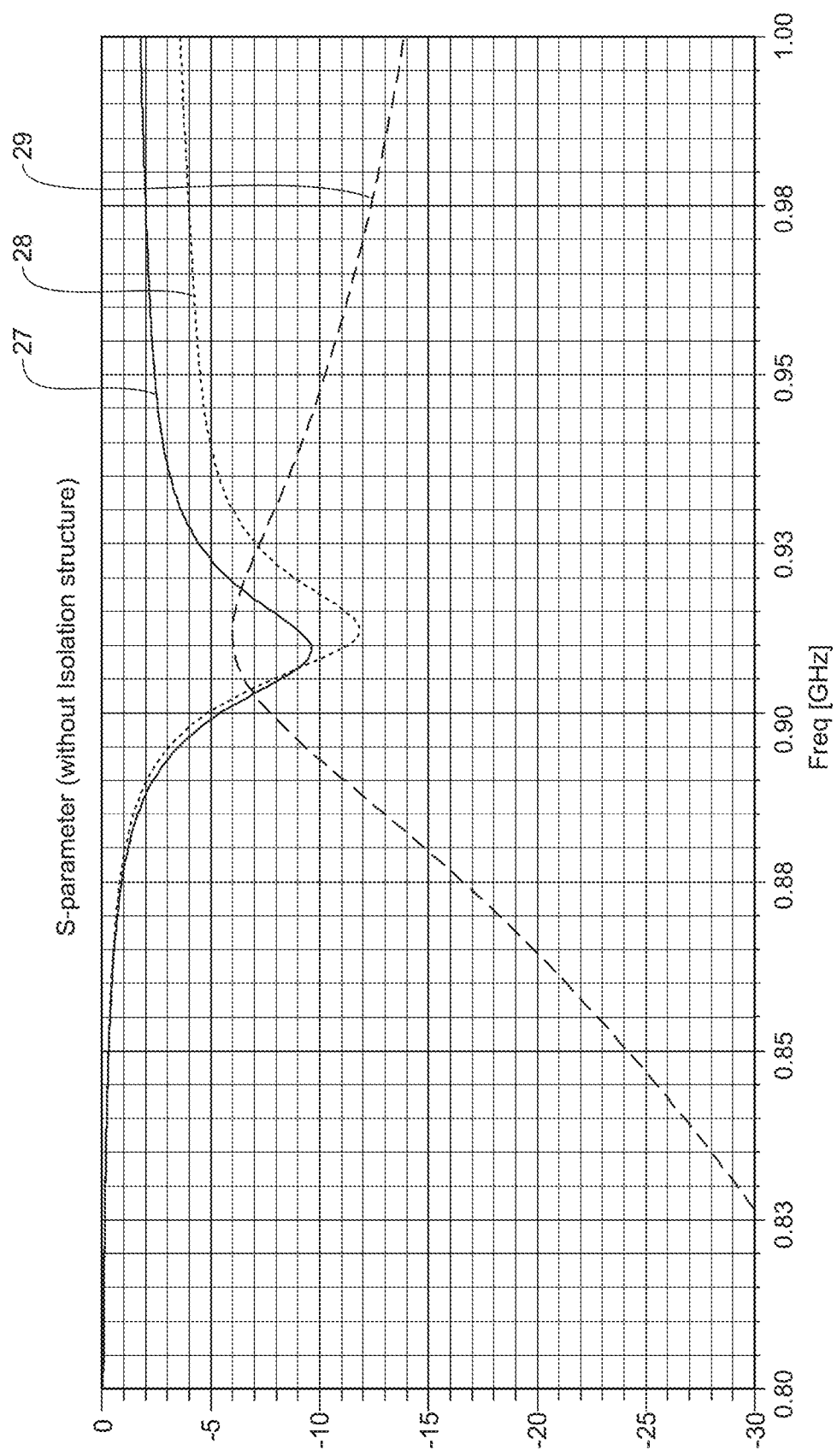

In the absence of the conductive isolation structure 37, the PCT of both antennas 43, 47 peak at around 65-70% (shown in FIG. 4). Accordingly, it is shown that the conductive isolation structure 37 has function to significantly suppress the coupling between the antennas of the first transponder 33 and the second transponder 35.

The inlay 31 of FIG. 6 is measured to be 79×67 mm. The distance between the centre point of the first transponder 33 and the centre point of the second transponder 35 is 40 mm. The closest distance between the antennas 43, 47 (perpendicular distance between the edge of the loops of the antennas) of the two transponders 33, 35 is 26 mm. Similar to the case of the embodiment of FIG. 1, these measurements are for illustrative purpose only and can be changed to suit the application of the RFID transponders.

Accordingly, based on the above discussion, it can be seen that the conductive isolation structures play an important role to allow the first RFID transponder and the second RFID transponder to operate close to each other on the same inlay even though they are operating in the same frequency band and have the same polarizations.

Figure 9:
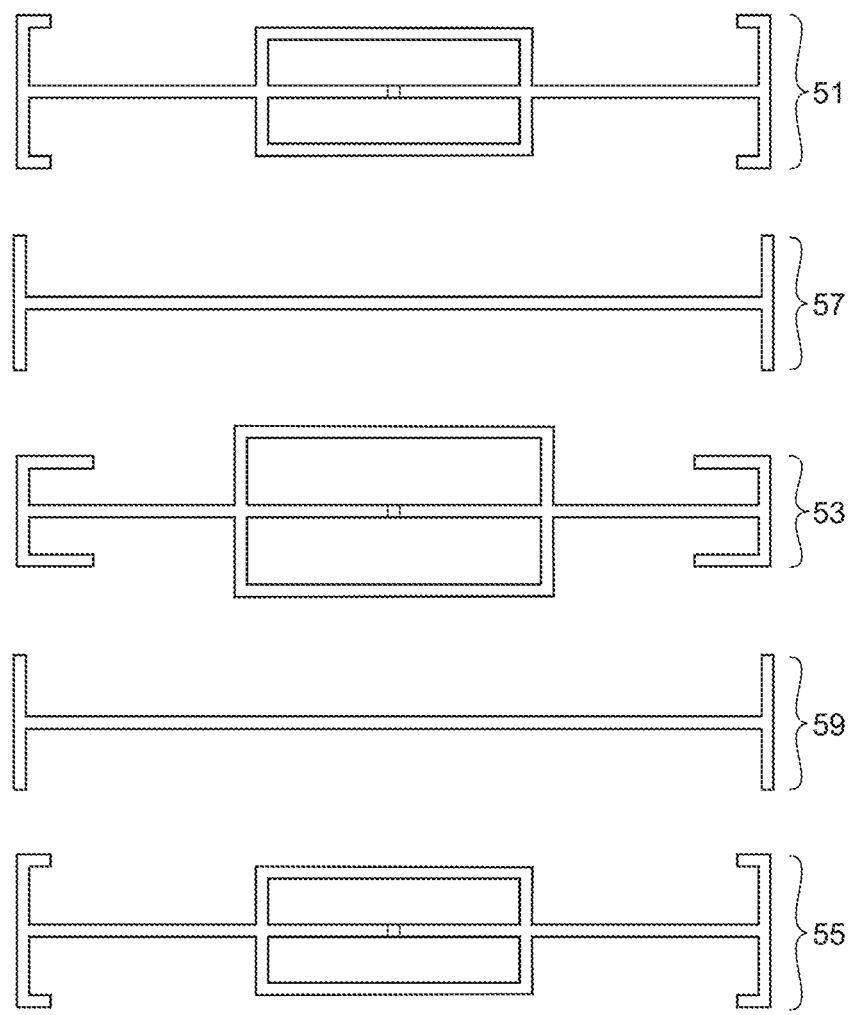
FIG. 9 depicts an embodiment where there are three RFID transponders.

FIG. 9 depicts an embodiment where there are three RFID transponders 51, 53, 55 on a same inlay, and with conductive isolation structures 57, 59 placed to reduce a mutual coupling between any two of the three RFID transponders 51, 53, 55.

Figure 10:
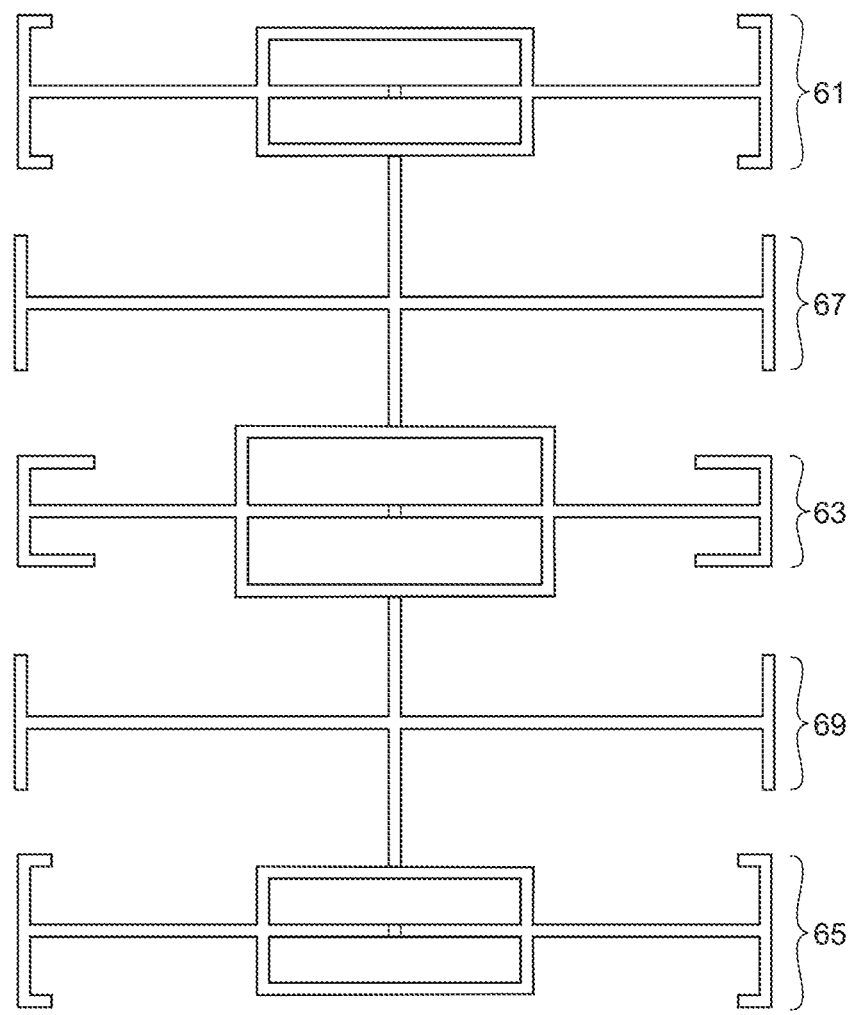
FIG. 10 depicts an embodiment where there are three RFID transponders with a conductive isolation structure connecting the three RFID transponders.

FIG. 10 depicts an embodiment where there are three RFID transponders 61, 63, 65 on a same inlay, and with conductive isolation structures 67, 69 placed to reduce a mutual coupling between any two of the three RFID transponders 61, 63, 65. As can be seen clearly, conductive isolation structures 67, 69 physically connect the three RFID transponders 61, 63, 65.

FIGS. 11 to 16 show different design variations where the RFID transponders are not necessarily arranged in parallel.

Figure 11:
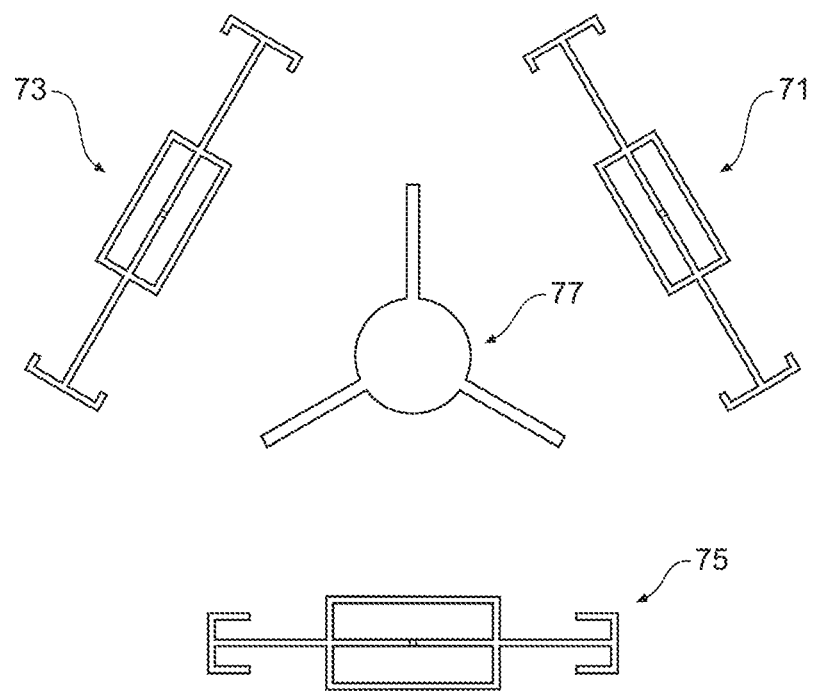
FIGS. 11 to 16 show different design variations where the RFID transponders are not necessarily arranged in parallel.

In FIG. 11, a single conductive isolation structure 77 reduces the mutual coupling between any two of RFID transponders 71, 73 and 75.

Figure 12:
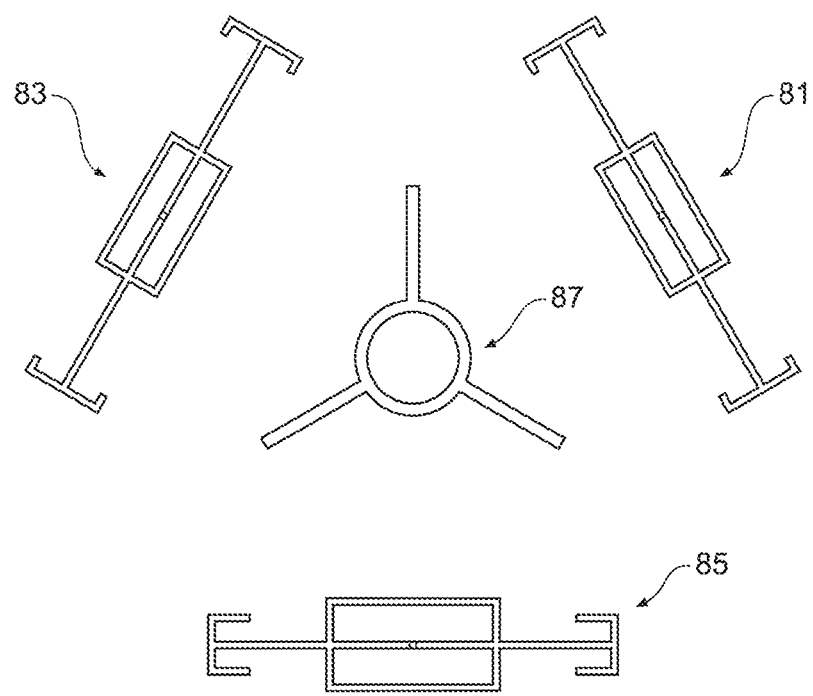

In FIG. 12, a single conductive isolation structure 87 reduces the mutual coupling between any two of RFID transponders 81, 83 and 85.

Figure 13:
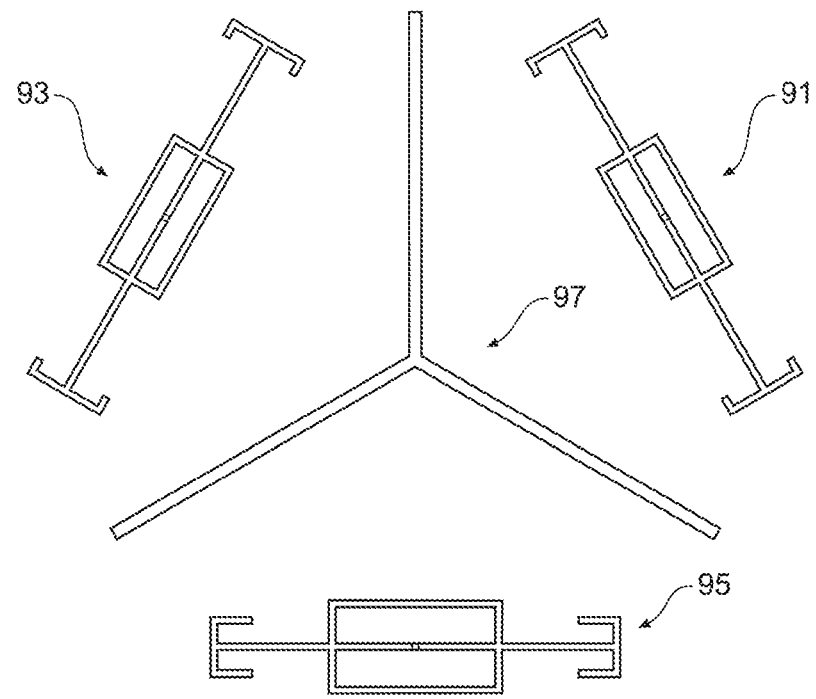

In FIG. 13, a single conductive isolation structure 97 reduces the mutual coupling between any two of RFID transponders 91, 93 and 95.

Figure 14:
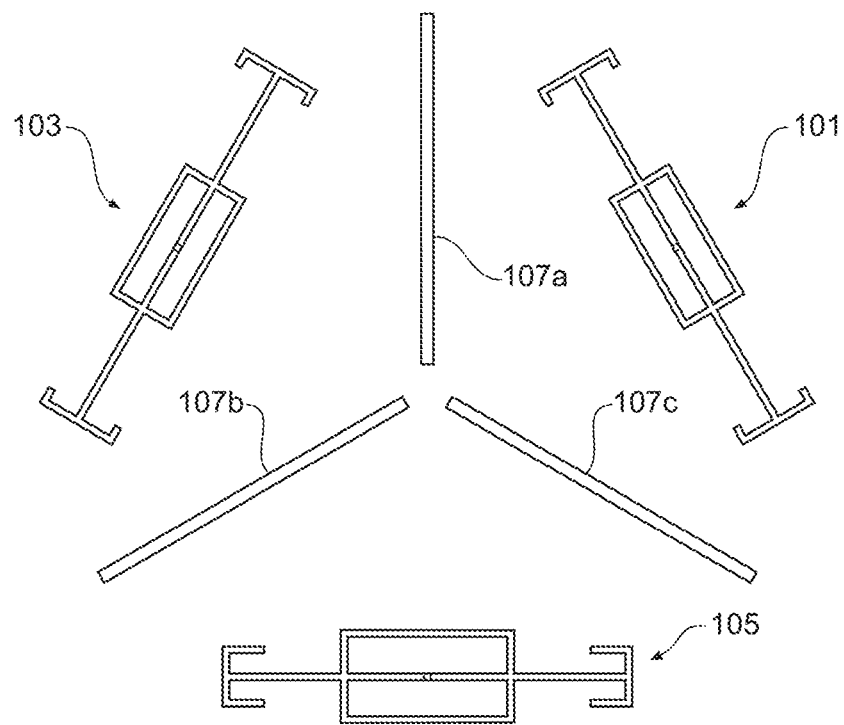

In FIG. 14, three conductive isolation structures 107a, 107b, 107c, reduce the mutual coupling between any two of RFID transponders 101, 103 and 105.

Figure 15:
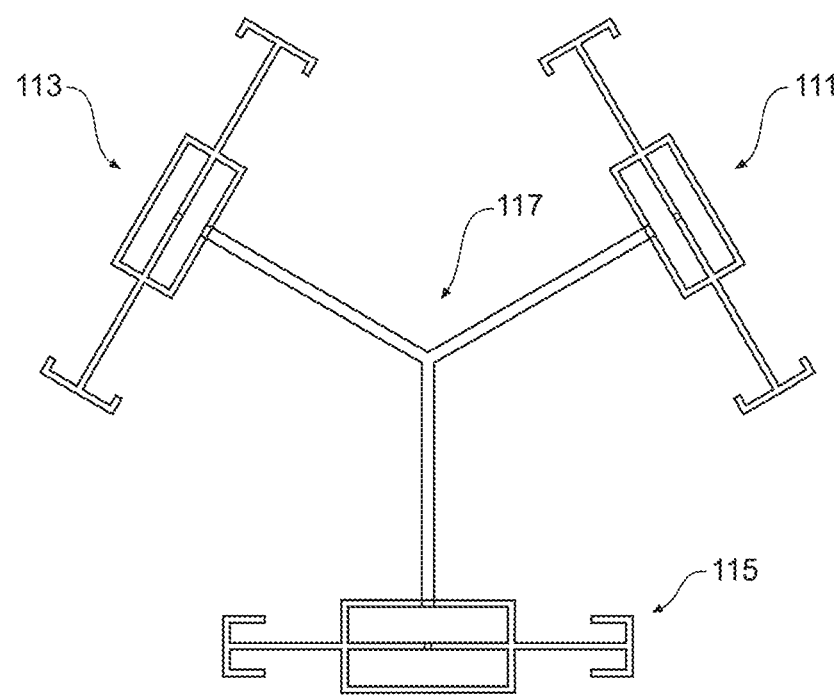

In FIG. 15, a single conductive isolation structure 117 reduces the mutual coupling between any two of RFID transponders 111, 113 and 115. As can be seen clearly, conductive isolation structure 117 physically connects the three RFID transponders 111, 113 and 115.

Figure 16:
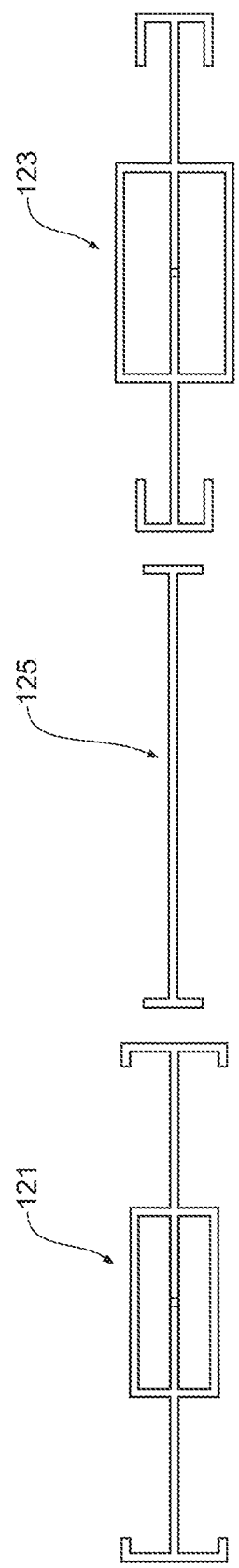

In FIG. 16, a single conductive isolation structure 125 reduces the mutual coupling between two RFID transponders 121, 123 in series.

While this disclosure allows close placement of multiple RFID transponders of different protocols in a same inlay, it is possible to have multiple RFID transponders of a same protocol on a same inlay if a situation requires such arrangement. Of course, it is envisaged that a more common situation is to have RFID transponders of different protocols in a single inlay.

Further, the problem addressed by the present invention is worse when the multiple RFID transponders (with same or different polarization) on a same inlay are operating in a same frequency band. In other words, the one or more conductive isolation structures offer the most when the multiple RFID transponders on a same inlay are operating in a same frequency band. In saying that, even when the RFID transponders on a same inlay are operating in different frequency bands, the one or more conductive isolation structures can still be applied so that the RFID transponders can be placed even closer together.

Further, it is possible that the conductive isolation structure is further arranged and configured such that the conductive isolation structure is adjustable to fine-tune a local minimum point (as shown in, for example, FIG. 8) for the mutual coupling between the first antenna and the second antenna across their operating band. It is possible to adjust such that the local minimum point is at or near a mid-point of their frequency band.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement or any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

What is claimed is:

1. A Radio Frequency Identification (RFID) inlay, the inlay comprising:

a first RFID far-field transponder with a first far-field antenna, based on a first RFID protocol;

a second RFID far-field transponder with a second far-field antenna, based on a second RFID protocol; and a conductive isolation structure;

wherein the conductive isolation structure is arranged and configured such that the conductive isolation structure reduces a mutual coupling between the first far-field antenna and the second far-field antenna; wherein the first RFID far-field transponder and the second RFID far-field transponder operate in a same RFID frequency band.

2. The RFID inlay of claim 1, wherein the conductive isolation structure allows the first RFID far-field transponder and the second RFID far-field transponder to operate close to each other on the inlay.

3. The RFID inlay of claim 1, wherein the second RFID protocol is different from or the same as the first RFID protocol.

4. The RFID inlay of claim 1, wherein the first RFID far-field transponder and the second RFID far-field transponder operate in a same frequency band.

5. The RFID inlay of claim 1, wherein the first RFID far-field transponder and the second RFID far-field transponder operate in different frequency bands.

6. The RFID inlay of claim 1, wherein the conductive isolation structure couples to the first RFID far-field transponder and the second RFID far-field transponder.

7. The RFID inlay of claim 1, wherein the conductive isolation structure is positioned between the first RFID far-field transponder and the second RFID far-field transponder.

8. The RFID inlay of claim 1, wherein the conductive isolation structure physically connects a part of the first far-field antenna to a part of the second far-field antenna.

9. The RFID inlay of claim 1, wherein the mutual coupling is reduced to lower than −15 dB.

10. The RFID inlay of claim 1, wherein the conductive isolation structure is further arranged and configured such that the conductive isolation structure is adjustable to fine-tune a local minimum point for the mutual coupling between the first far-field antenna and the second far-field antenna across their operating band.

11. The RFID inlay of claim 10, wherein the local minimum point is at or near a mid-point of their frequency band.

12. The RFID inlay of claim 1, further comprising a third RFID far-field transponder with a third far-field antenna, based on a third RFID protocol, wherein the conductive isolation structure is further arranged and configured such that the conductive structure reduces a mutual coupling between any two of the first far-field antenna, the second far-field antenna and the third far-field antenna.

13. The RFID inlay of claim 12, wherein the third RFID protocol is different from or the same as the first RFID protocol and the second RFID protocol.

14. A Radio Frequency Identification (RFID) inlay, the inlay comprising:

a plurality of RFID far-field transponders, each with a respective far-field antenna, and at least two of the RFID far-field transponders are based on different RFID protocols; and one or more conductive isolation structures;

wherein the one or more conductive isolation structures are arranged and configured such that the one or more conductive structures reduce a mutual coupling between any two of the plurality of RFID far-field transponders.

15. The RFID inlay of claim 14, wherein the one or more conductive isolation structures allow the plurality of RFID far-field transponders to operate close to each other on the inlay.

\* \* \* \* \*